US006644243B1

United States Patent
McRae

(10) Patent No.: US 6,644,243 B1
(45) Date of Patent: Nov. 11, 2003

(54) SYSTEM AND METHOD FOR CLAM FARMING

(76) Inventor: Douglas S. McRae, 3824 41st Ct. NW., Gig Harbor, WA (US) 98335

( * ) Notice: Subject to any disclaimer, the term of this patent is extended or adjusted under 35 U.S.C. 154(b) by 0 days.

(21) Appl. No.: 10/243,430

(22) Filed: Sep. 13, 2002

(51) Int. Cl.[7] .......................... A01K 61/00; A01K 80/00
(52) U.S. Cl. ..................................................... 119/234
(58) Field of Search ................................ 119/200, 234, 119/235

(56) References Cited

U.S. PATENT DOCUMENTS 6,082,303 A * 7/2000 Ware et al. .................. 119/200
6,223,689 B1 * 5/2001 Nelson ........................ 119/234

FOREIGN PATENT DOCUMENTS

SU            1565-439 A    *   5/1990

* cited by examiner

Primary Examiner—Charles T. Jordan
Assistant Examiner—Kimberly S. Smith
(74) Attorney, Agent, or Firm—Davis Wright Tremaine LLP; Brian L. Johnson

(57) ABSTRACT

A system and method for clam farming includes a supply ship coupled to a clam planter via a supply tube bundle having a plurality of individual tubes. The supply ship has a separation station configured for introducing individual clams into the individual supply tubes at a periodic interval. The clam planter includes an underwater vehicle and a plurality of row components that are slideably engaged with the underwater vehicle. Each of the row components is coupled to one of the individual tubes. As the underwater vehicle travels in a forward direction, the row components plow furrows and transport the individual clams into the furrows as they exit the individual tubes according to the periodic interval. A clam farm results having rows of clams near node points spaced from one another by node and row separation distances.

5 Claims, 10 Drawing Sheets

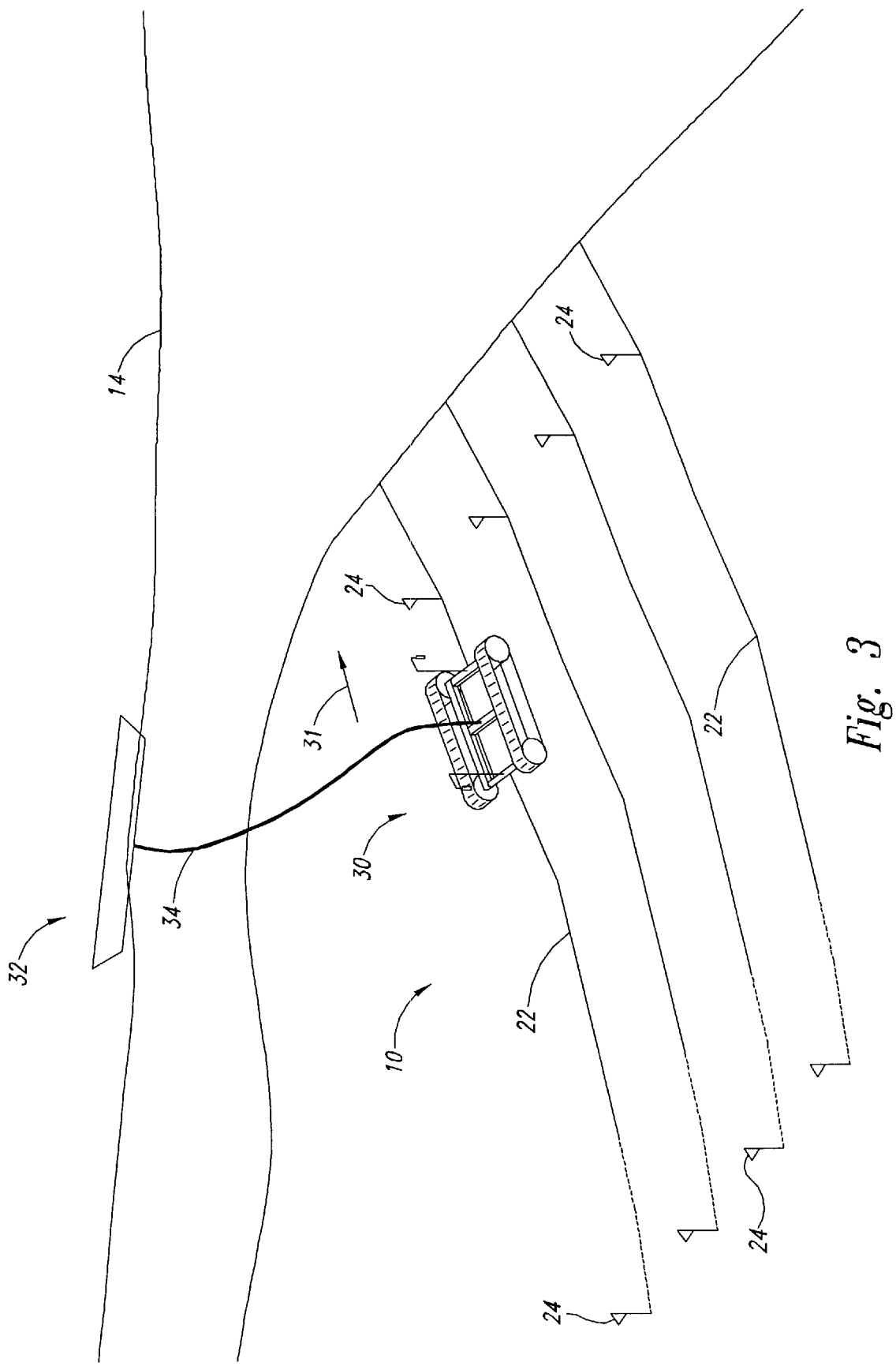

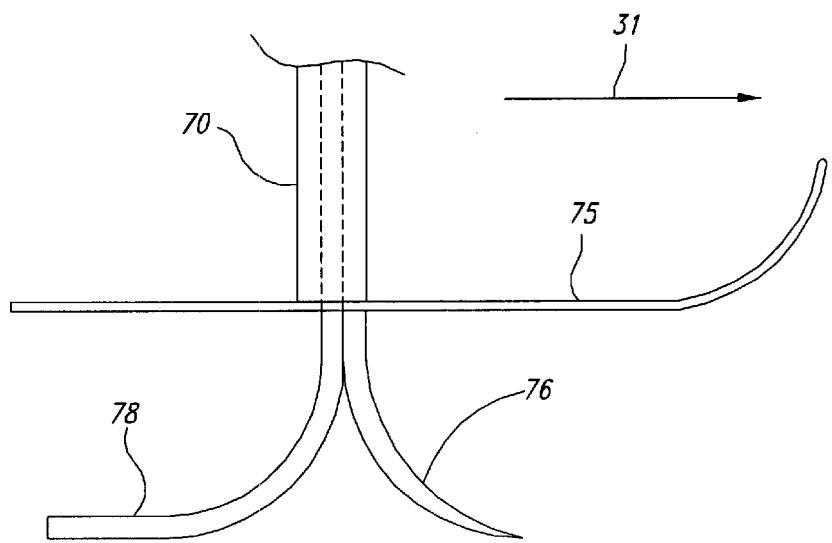
Fig. 7A
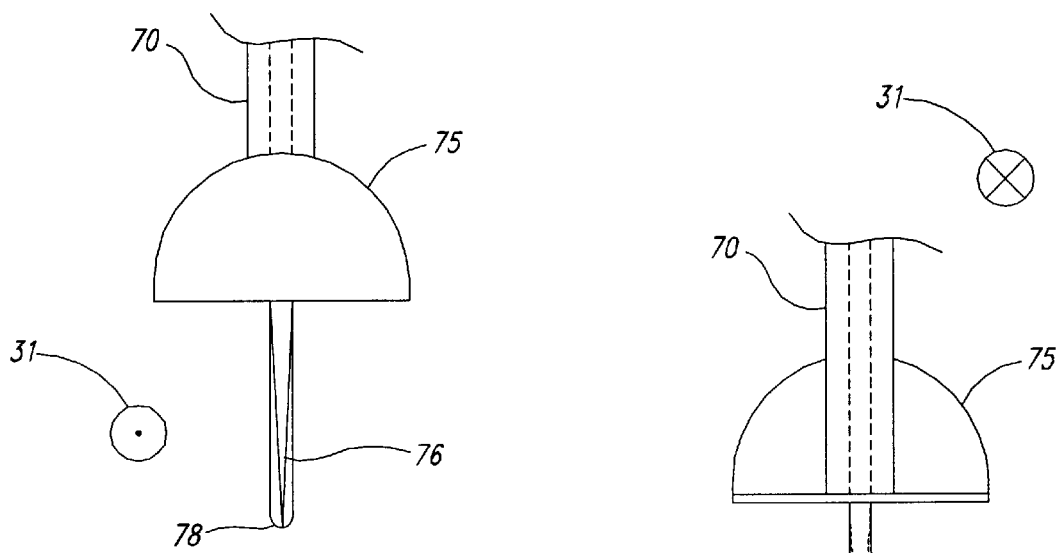
Fig. 7B
Fig. 7C

SYSTEM AND METHOD FOR CLAM FARMING

BACKGROUND OF THE INVENTION

1. Field of the Invention

The invention relates, in general, to aquaculture production of seafood, and, in particular, to systems and methods for clam farming.

2. Description of the Related Art

Conventional clam farming experiences relatively high mortality rates during the clam growth period generally lasting many months or years for clams to grow to marketable size from seed stock. In an attempt to counter the mortality issue of the growth period, conventional clam farmers plant clams in relatively high densities. Unfortunately, this high density planting can increase expenditures for the initial seed stock. Also, with high planting densities, mortality rates during harvest are increased because as some clams are dug up, their closely packed neighbors are accidentally destroyed. Furthermore, mortality during the growth period typically has a less than uniform distribution with possible results including areas with few or no clam populations and other areas having overly dense populations of poorly formed and stunted clams adversely impacting production efficiencies.

BRIEF SUMMARY OF THE INVENTION

Some embodiments include a clam farm below the surface of a body of water having a mean high tide level. The clam farm includes a plurality of clams arranged in rows. The rows are separated from each other by substantially a row separation distance. Each row has node points being separated from one another by a node separation distance. Each clam is buried substantially at a predetermined depth below a portion of the Earth's surface, the portion of the Earth's surface being below the mean high tide level of the body of water. Each clam has a hinge with a reference point being defined as a mid-point on the clam hinge. Each buried clam has its reference point located within 30% of the node separation distance and within 30% of the row separation distance from one of the node points on one of the rows.

Other embodiments include a system associated with a body of water having a surface. The system includes a supply ship configured to be located on or near the surface of the body of water. The supply ship includes a separation station having at least one receiver configured to receive clams and transport fluid. A clam planter includes an underwater vehicle and at least one row component. The underwater vehicle is configured to travel along the Earth's surface below the surface of the body of water. The row component is slideably coupled to the underwater vehicle and configured to expose portions of the Earth at a predetermined depth below its surface as the underwater vehicle travels along the Earth's surface. A tube is coupled to the receiver and the row component. The tube is configured to conduct the received clams and the transport fluid from the receiver of the separation station to the row component. The row component is further configured to output the received clams into the exposed portions.

Other embodiments include a method for planting clams in part of the Earth having a surface below a surface of a body of water. The method includes introducing an individual clam into an opening of a first end of a tube; exposing a portion of the part of the Earth below its surface to a predetermined depth; and positioning a second end of the tube with respect to the exposed portion of Earth to allow the clam to enter the exposed portion of Earth.

BRIEF DESCRIPTION OF THE SEVERAL VIEWS OF THE DRAWING(S)

FIG. 3 is a schematic showing a clam planter coupled to a supply ship by a supply tube in relation with the clam farm.

FIG. 7A is an enlarged side view schematic of a lower portion of a row component of the claim planter shown in FIG. 5.

FIG. 7B is an enlarged front view schematic of the lower portion of the row component shown in FIG. 7B.

FIG. 7C is an enlarged rear view schematic of the lower portion of the row component shown in FIGS. 7A and 7B.

DETAILED DESCRIPTION OF THE INVENTION

A system and method for clam farming is described herein to plant, grow, and harvest clams while emphasizing considerations such as mortality reductions and production efficiencies.

Figure 1:
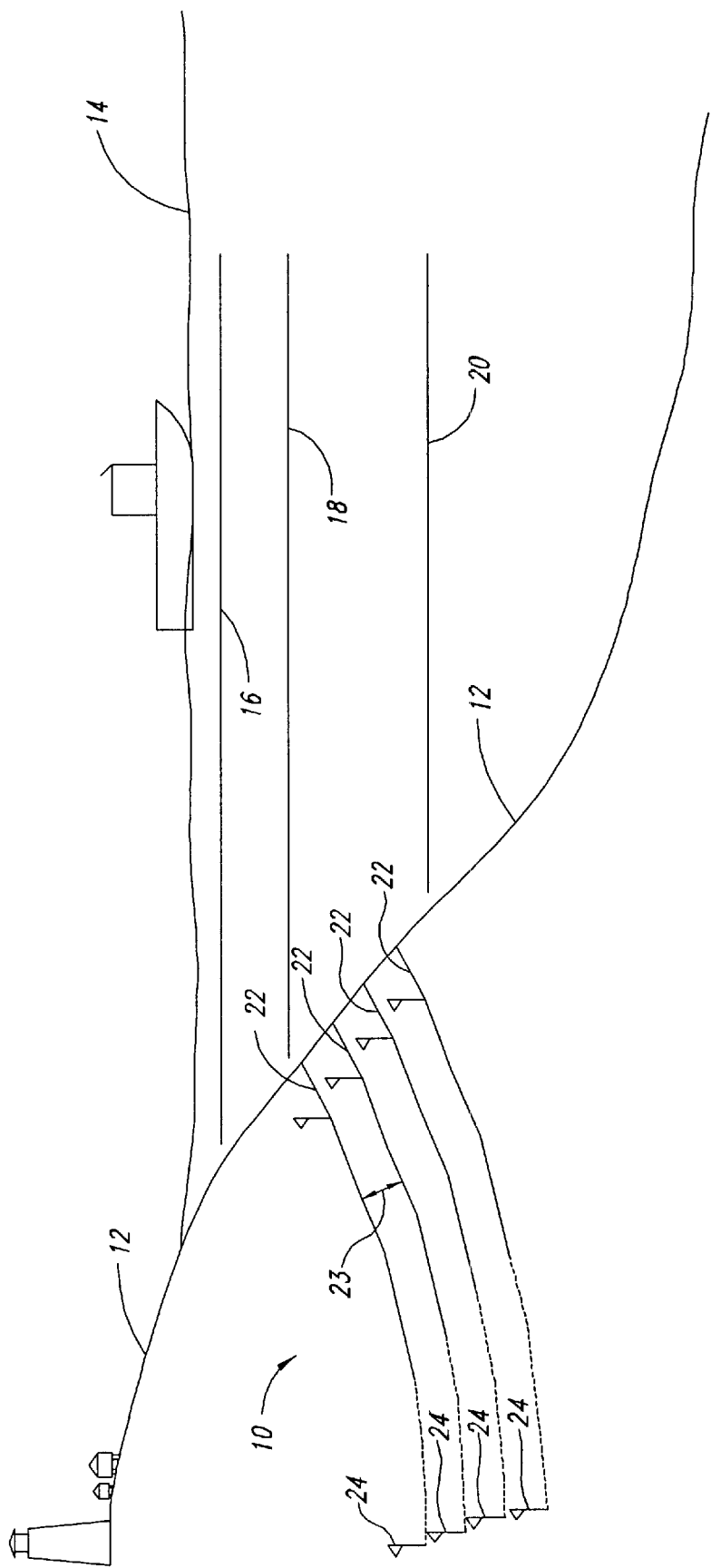
FIG. 1 is a schematic illustrating of a clam farm.

As generally depicted in FIG. 1, a clam farm 10 is located along and below a portion of the Earth's surface 12 being generally at or below a mean tide level 16, and more particularly, at or below an upper depth 18 dependent upon an inter-tidal zone having a mean tidal high and mean tidal low and at or above a lower depth 20 generally dependent upon physiological constraints of divers or other practical constraints imposed by growing conditions for the clams if automated robotic harvesting techniques were employed.

Figure 2A:
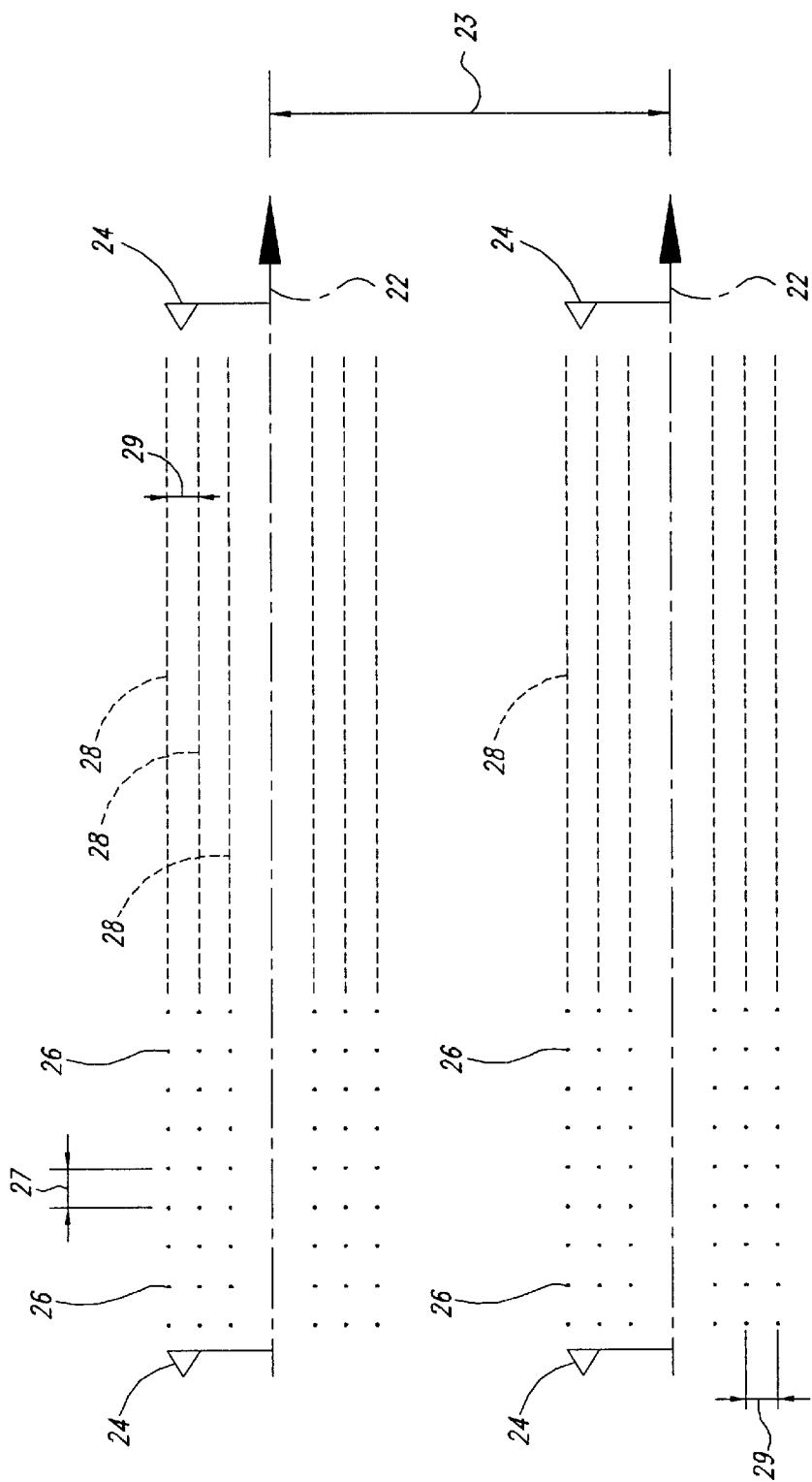
FIG. 2A is a schematic illustrating a first implementation portion of the clam farm.
Figure 2B:
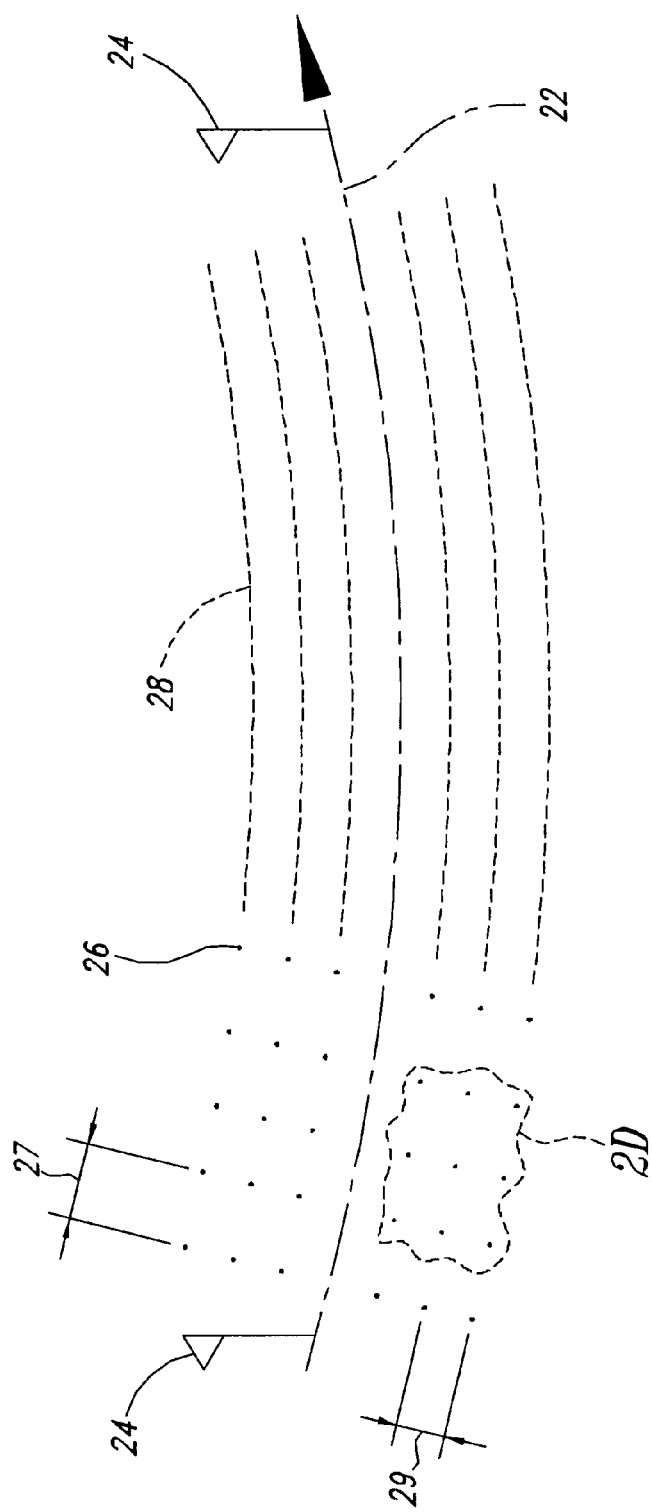
FIG. 2B is a schematic illustrating a second implementation portion of the clam farm.

In the clam farm 10, clams are planted at a predetermined depth below the Earth's surface with reference to guides 22, made from polyethylene rope, wire, bundled cable, fiber optic cable, or other flexible members, laid out along the Earth's surface or etched into the Earth's surface. The guides 22 are generally separated by a guide separation distance 23 from each other and further demarcated by markers 24, such as weighted lines with buoys, or flags, or other demarcating device. In particular and is best seen in FIG. 2A, clams 26 are generally spaced from one another, given certain tolerances and mortalities further discussed below, a node separation distance 27 in sequential placements or rows 28. The rows 28 are spaced from one another by a row separation distance 29, which is typically substantially equal to the node separation distance 27 as shown in FIG. 2A. The rows 28 extend generally parallel to the guide 22. Portions of the rows 28 can be substantially straight as exemplified in FIG. 2A or curved as exemplified in FIG. 2B depending upon the contour of the particular portion of the Earth's surface 12 where the rows are located.

Figure 2C:
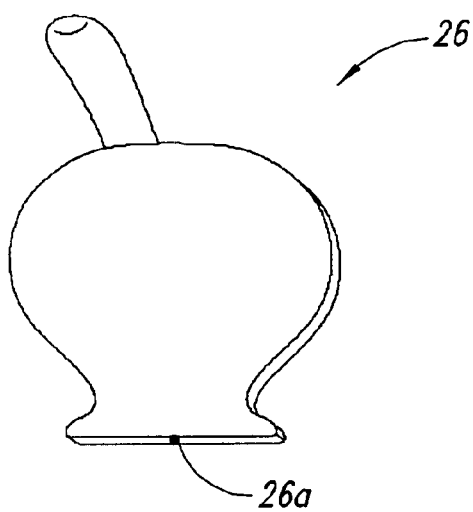
FIG. 2C is a schematic illustrating a clam.
Figure 2D:
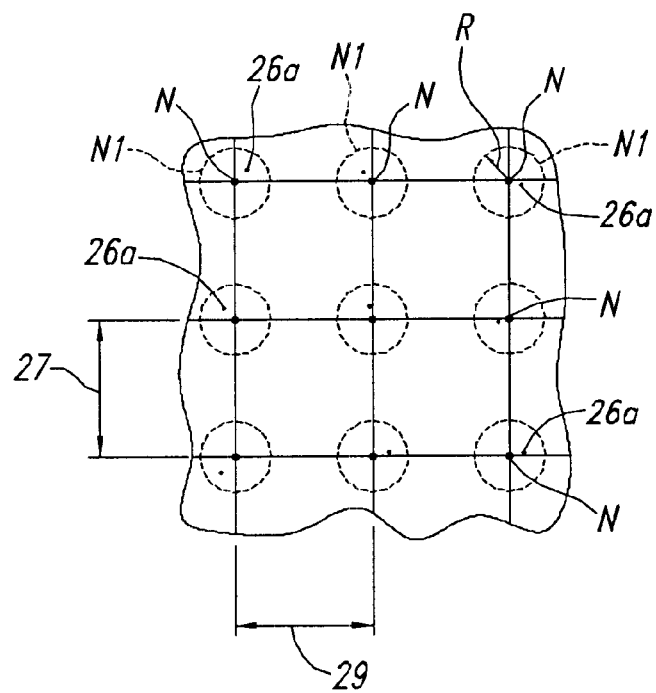
FIG. 2D is a schematic illustrating further detail of the clam farm portions including positioning of the clam shown in FIG. 2C.

To further describe placement of the clams 26, a clam reference point 26a, shown in FIG. 2C, is defined as being located mid-way on the hinge of each clam 26. The clams 26 are planted along the rows 28 so that the clam reference points 26a are substantially located within a given tolerance region N1 of a node point N of a grid of node points N spaced from one another along the rows by the node separation distance 27 and spaced apart from adjacent rows by the row separation distance 29 as shown in the fragmentary portion of the clam farm 10 shown in FIG. 2D. During planting of the clams 26, each of the clam reference points 26a is located within its respective tolerance region N1 around the associated node point N, depicted as a circular region with a radius R having a length approximately 5% to 30% of the node separation distance 27 or the row separation distance 29, which are typically the same.

If the clams 26 have been successfully planted to a proper pre-determined depth below the Earth's surface 12, the clams will remain substantially stationary so that as each of the clams grow, the associated clam reference point 26a will remain within its respective tolerance region N1 of the associated node point N. Furthermore, during the growth period of the clams 26, some implementations can experience certain mortalities of typically up to 15% and other implementations up to 25% such that 85% or 75%, respectively, of the clams mature for harvest at the desired marketable weight. Consequently, although substantially all of the node points N will have one clam reference point 26a within the associated tolerance region range immediately after planting to entirely populate the clam farm 10, at the end of the growth period at harvest time, there will not be a harvestable viable clam with an associated clam reference point 26a within the tolerance regions of the node points N for up to the 15% or 25% of the node points N.

The node separation distance 27 and the row separation distance 29 can be chosen based upon such factors as nutrient levels and rates available to the clams 26, water temperature and ranges, desired range of marketable weight for the clams, whether a desired planting depth of the clams can be achieved, the species of clams being planted, and the size of the clams being planted. An exemplary implementation for geoduck (*panopea generosa*) or horse clams may use a distance value between 6 and 12 inches for the node separation distance 27 and the row separation distance 29, with the distance value possibly being as small as 3 inches for a desired marketable weight range of between 1.5 and 2 pounds. Other clams, such as manila clams, with a smaller desired marketable weight range may have the node separation distance 27 and the row separation distance 29 between 2 and 3 inches with the distance value possibly being as small as 1 inch.

The clams 26 are planted using a clam planter 30 traveling along the guide 22 in a forward direction of travel 31, as shown in FIG. 3. The clams 26 are supplied to the clam planter 30 from a supply ship 32 by a supply tube bundle 34. The clam planter 30 is configured to plant a plurality of the rows 28 typically on either side of the guide 22 in one pass as the clam planter traces the trail demarcated by the guide.

The supply tube bundle 34 is typically made up of a plurality of individual tubes, one for each of the plurality of the rows 28 planted in a pass. The tubes of the supply tube bundle 34 typically are flexible to allow for motion of the supply ship 32 and the clam planter 30 and are typically substantially clear to allow for visual monitoring of the clams 26 as they move through the tubes. Each individual tube supplies the clams 26 to the clam planter 30 for a separate one of the rows 28 that the clam planter plants in a single pass along the guide 22. For each one of the rows 28 that the clam planter 30 plants at any one pass, the clams 26 are introduced into the respective individual tubes of the supply tube bundle 34 at a periodic interval with the clam planter traveling at substantially a uniform velocity, such as 3 to 30 ft/min, in the forward direction of travel 31 selected, so that the clams 26 are planted at substantially the node separation distance 27 within a desired tolerance region N1 such as described above. Furthermore, the row separation distance 29 is determined by structural configurations of the clam planter 30 further detailed below.

Figure 4:
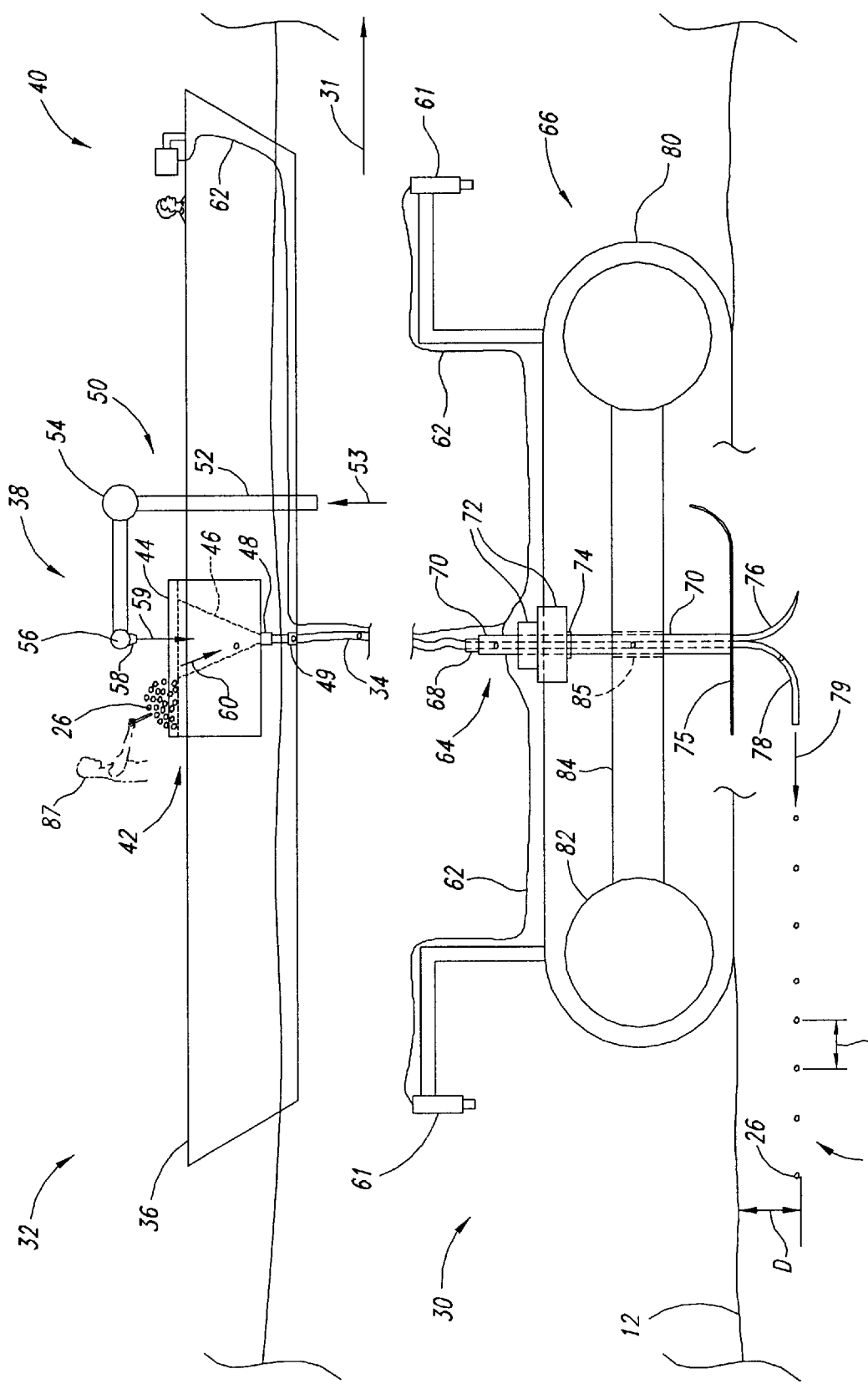
FIG. 4 is an enlarged side view schematic of the clam planter and supply ship shown in FIG. 3.

As shown in FIG. 4, the supply ship 32 includes a surface platform 36 to support operations personnel and equipment involved with supplying the clams 26 to the clam planter 30. Equipment on the supply ship 32 includes a separation station 38 and a control station 40. The separation station 38 includes a work bench 42 with a top surface 44 to position the clams 26 to be individually separated for introduction into an individual tube of the supply tube bundle 34 through one of a plurality of receivers 46 being equal to the number of the plurality of rows being planted in a pass of the clam planter 30. Each of the individual tubes of the supply tube bundle 34 is coupled to one receiver 46 of the separation station 38. Each receiver 46 of the plurality of receivers has a reduced portion 48 that is coupled by a fitting 49 to one of the individual tubes of the supply tube bundle 34.

The receivers 46 are generally funnel shaped to allow for a transition of separated clams 26 from being stationary with other clams on the surface 44 of the work bench 42 to being transported inside one of the individual tubes of the supply tube bundle 34. Once one of the clams 26 is separated and introduced into the receiver 46 a water supply 50 provides water to transport the clam from the receiver into one of the individual tubes. The waters supply 50 uses an extraction tube 52 to gather uptake water 53 through a pumping action provided by a pump 54 and to distribute the uptake water 53 as transport water 59 through a manifold 56 coupled with a plurality of individual nozzles 58 one associated with each receiver 46. The transport water 59 leaving each of the individual nozzles 58 is directed into the associated one of the receivers 46 to assist in moving the clam 26 therein in a clam entry direction 60 toward and into the individual tube of the supply tube bundle 34 attached to the receiver.

The clam planter 30 includes cameras 61 coupled to the control station 40 through a control cable 62 that allow an operator at the control station to monitor planting and travel progress by the clam planter and to accordingly adjust operational aspects of the clam planter through the control station, such as travel speed and direction of travel of the underwater vehicle 66, flow rate of the transport water 59, and interval period for introduction of the individual clams 26 into the individual tubes of the supply tube bundle 34. The clam planter 30 further includes a plurality of row components 64 having a number equal to the plurality of rows planted in one pass by the clam planter and an underwater vehicle 66 carrying the row components as the clam planter travels. Each of the row components 64 is coupled to one of the individual tubes of the supply tube bundle 34 by a fitting 68 to receive the clams 26 from the supply ship 32. Each of the row components 64 includes a shaft 70 slideably coupled to the underwater vehicle 66 in a substantially vertical orientation along its longitudinal dimension.

Removably coupled to a mid-portion of the shaft 70 are one or more weights 72 secured on the shaft through use of a stop 74 located therebelow. Coupled to another mid-portion of the shaft 70 below the weights 72 is a ski 75 configured to ride upon the Earth's surface 12 to maintain a desired spatial relationship of the shaft with respect to the Earth's surface. Further coupled to a lower portion of the shaft 70 are a plow 76 and a deposit tube 78. The shaft 70 is hollow along its longitudinal dimension and receives the clams 26 through the fitting 68 from one of the individual tubes of the supply tube bundle 34 and transports the clams to the end of the deposit tube 78. The plow 76 extends from the ski 75 to a predetermined depth D into the Earth to create a furrow ahead of the position of the deposit tube 78 with the underwater vehicle 66 moving in the forward direction of travel 31 and the row components 64 so coupled to the underwater vehicle as shown in FIG. 4.

The deposit tube 78 is curved rearward, away from the plow 76 so that as the underwater vehicle 66 moves in the forward direction of travel 31 the deposit tube does not become plugged with soil substrate. The clams 26 exit the deposit tube 78 at the predetermined depth D in one of the rows 28 and at intervals substantially spaced at the node separation distance 27 based upon periodic separation and introduction of individual clams into the corresponding receiver 46 of the supply ship 32. The predetermined depth D is dependent upon the size of the clams 26 being planted. For instance, typically for implementations for planting clams 26 ranging in size between 2 mm and 12 mm, a depth of approximately 3.5 to 4 inches has been found effective.

Figure 5:
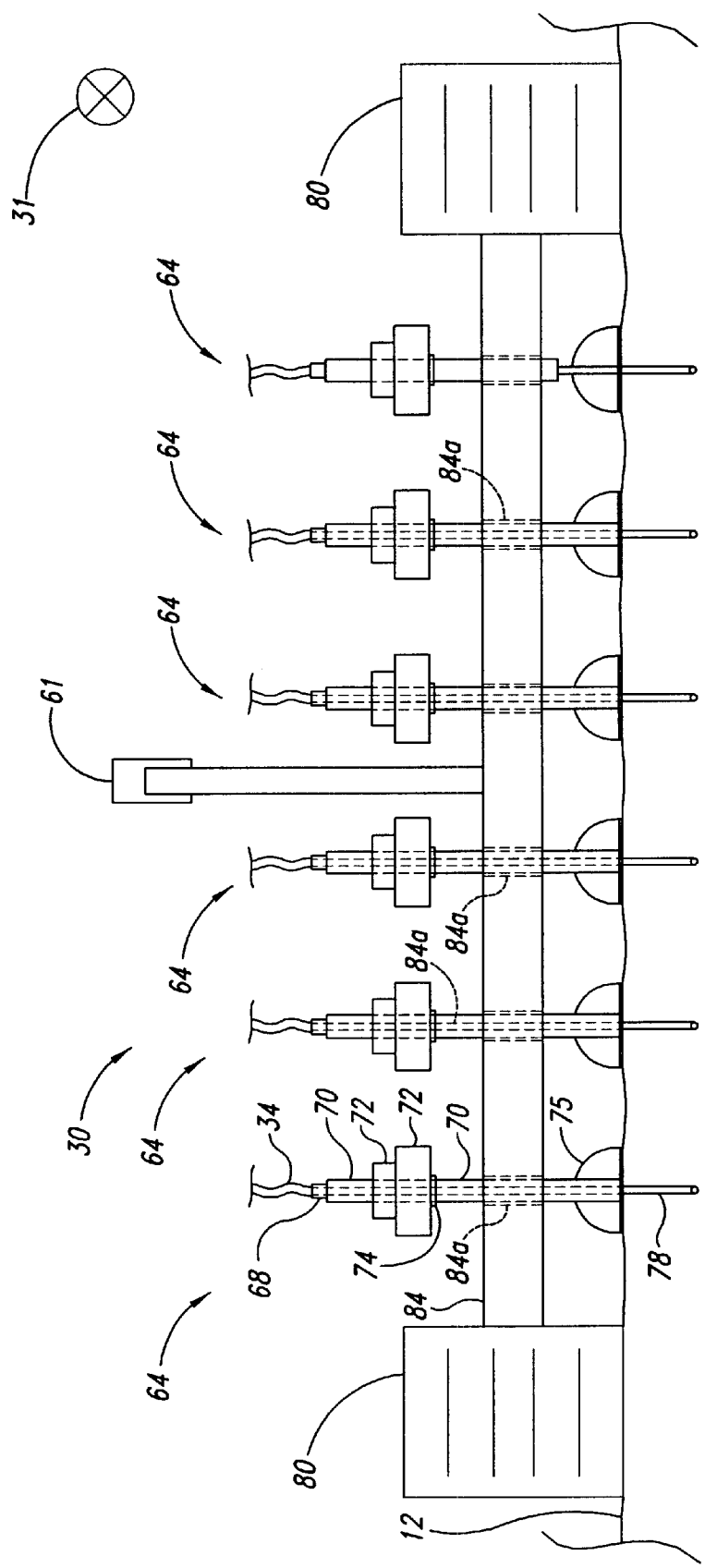
FIG. 5 is an enlarged rear view schematic of the clam planter shown in FIG. 3 and 4.

The underwater vehicle 66 follows generally accepted construction and design practices for underwater vehicles including treads 80, wheels 82, and frame members 84. Details of the underwater vehicle 66 including propulsion and control are conventionally known. As best shown in FIG. 5 for an exemplary implementation, one of the frame members 84 running perpendicular to the forward direction of travel 31 has a series of vertical openings 84a, which each allow one of the shafts 70 of the row components 64 to be slideably coupled to the underwater vehicle 66 while allowing the shaft to move vertically in a fashion largely independent to the vertical position of the frame member.

Figure 6A:
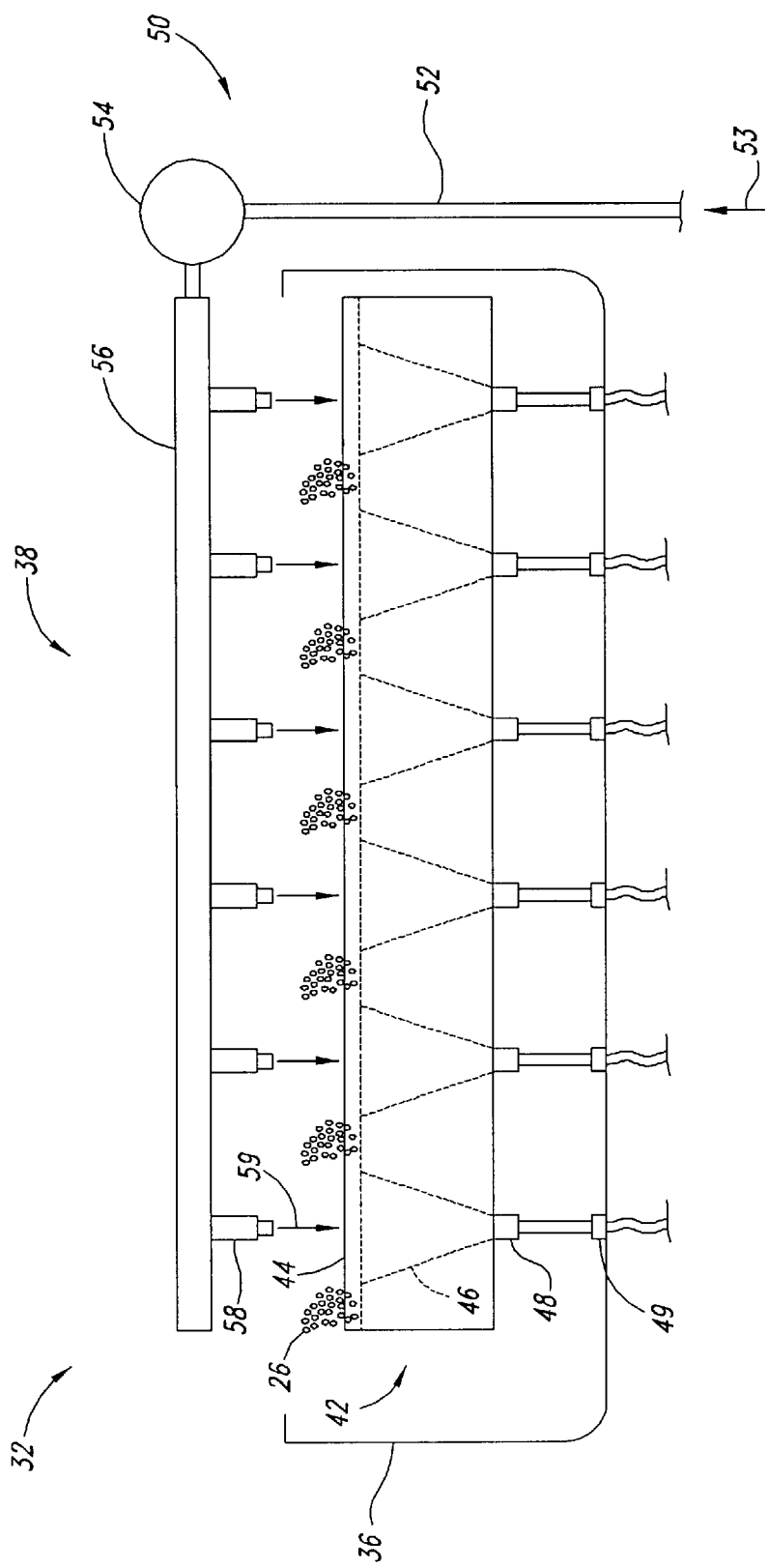
FIG. 6A is an enlarged schematic of a separation station of the supply ship shown in FIGS. 3 and 4.
Figure 6B:
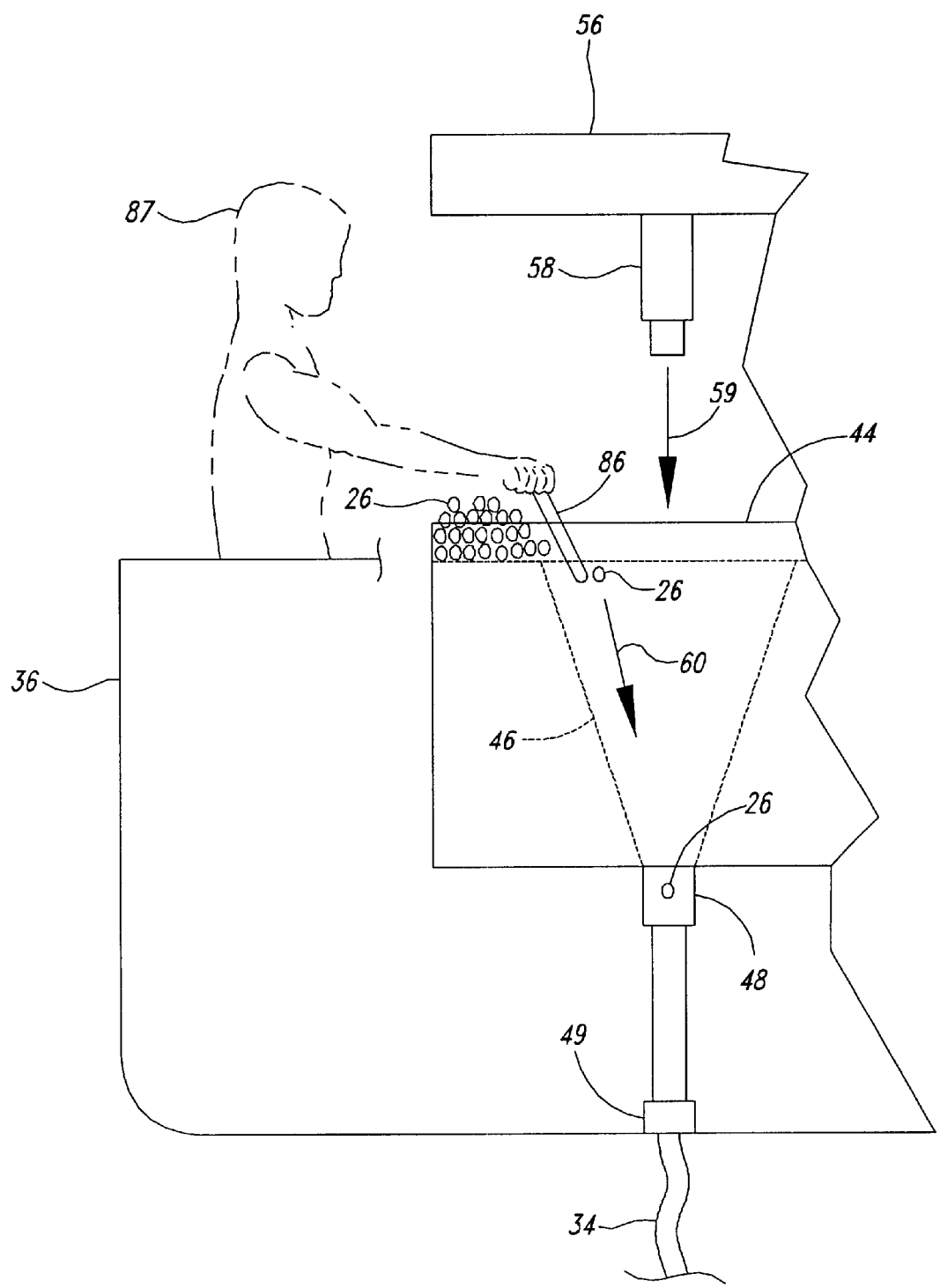
FIG. 6B is an enlarged schematic of a portion of the separation station shown in FIG. 6A showing further operational details.

FIG. 6A has further detail of the exemplary separation station 38 showing a full complement of six receivers 46 and associated nozzles 58 coupled to the manifold 56. FIG. 6B shows operational details wherein an operator 87 uses a separator tool 86 to separate one of the clams 26 from a pile clams to introduce the separated clam to the receiver 46 to be transported by transport water 59 from one of the nozzles 58 into one of the individual tubes of the supply tube bundle 34. Further implementations include a signaling device (not shown) to alert the operator when to separate a next clam to send to the receiver 46. The signaling device could use any combination of audio, tactile, or visual stimulation to alert the operator. The signaling device would typically be communicatively linked to the control station 40 so that the frequency of when the individual clams 26 are introduced into the receivers 46 would be coordinated with the speed of the underwater vehicle 66 in the forward direction of travel 31.

Various orientational views of the ski 75, the plow 76, and the deposit tube 78 are shown in FIGS. 7A–7C. FIG. 7A is a side view with respect to the forward direction of travel 31, which shows detail of how the hollow center portion of the shaft 70 interfaces with the deposit tube 78. Although the plow 76 is shown with a pointed tip, many other implementations can be used which include both sharp and dulled rods, tines, and other substantially rigid extending members. As shown in FIGS. 7A–7C, the exemplary implementation of the ski 75 has a broad form somewhat reminiscent of a shape of a water-ski although in other implementations, the ski may have other configurations including other widths, tapers, and tip shapes such as used for types of activities involving water, snow, earth, or ice. In some implementations, the ski 75 may be slightly bent along its longitudinal edges (not shown) in such a way to gently push the soil loosened by the plow 76 back onto portions of the furrow created by the plow immediately after the clams 26 have been placed into those portions of the furrow.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. Note: it will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as"having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an"(e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

I claim:

1. A clam farm below the surface of a body of water having a mean high tide level, the clam farm comprising:

a plurality of clams arranged in rows, the rows being separated from each other by substantially a row separation distance, each row having node points being separated from one another by a node separation distance, each clam buried substantially at a predetermined depth below a portion of the Earth's surface, the portion of the Earth's surface being below the mean high tide level of the body of water, each clam having a hinge with a reference point being defined as a mid-point on the clam hinge, each buried clam having its reference point located within 30% of the node separation distance and within 30% of the row separation distance from one of the node points on one of the rows.

2. The clam farm of claim 1 wherein the number of clams is greater than 75% of the number of node points.

3. The clam farm of claim 1 wherein the predetermined depth is between 2.5 inches and 3 inches.

4. The clam farm of claim 1 wherein the row separation distance and the node separation distance are both greater than 3 inches.

5. The clam farm of claim 1 wherein the rows are substantially straight.

* * * * *